No. 655,718. Patented Aug. 14, 1900.
J. LANZ.
APPARATUS FOR SWAGING AXLES.
(Application filed Apr. 24, 1897. Renewed July 9, 1900.)

(No Model.) 6 Sheets—Sheet 1.

No. 655,718. Patented Aug. 14, 1900.
J. LANZ.
APPARATUS FOR SWAGING AXLES.
(Application filed Apr. 24, 1897. Renewed July 9, 1900.)
(No Model.) 6 Sheets—Sheet 3.
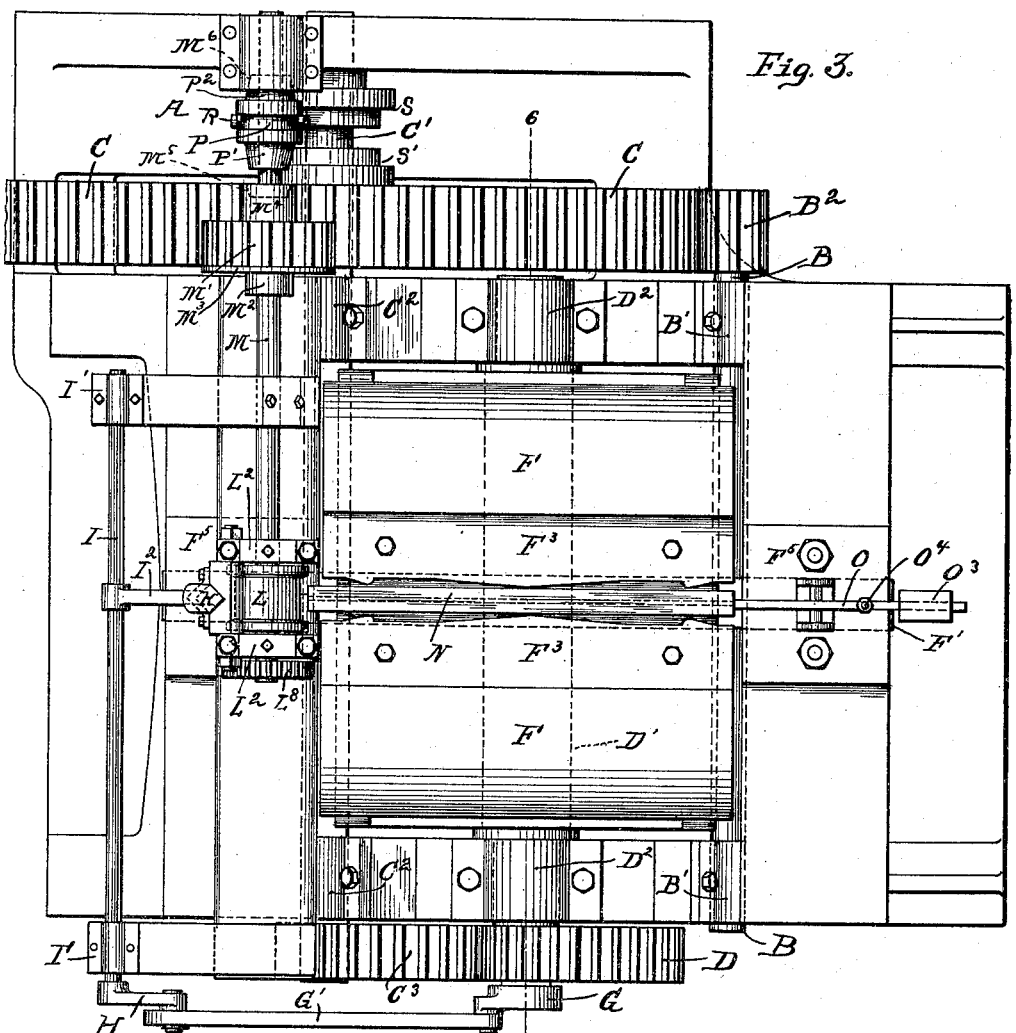
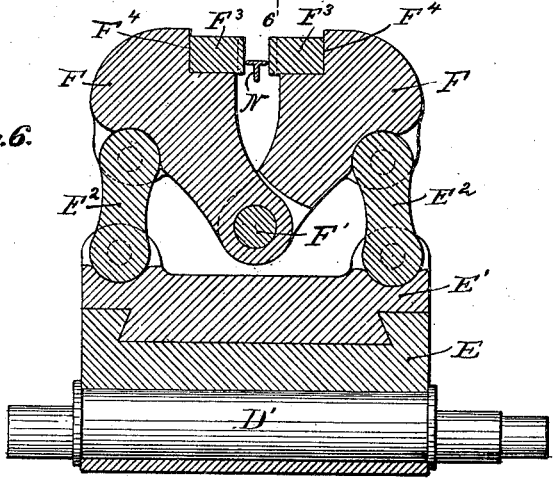
Witnesses:
Inventor:
John Lanz
By Kay & Totten
Attorneys

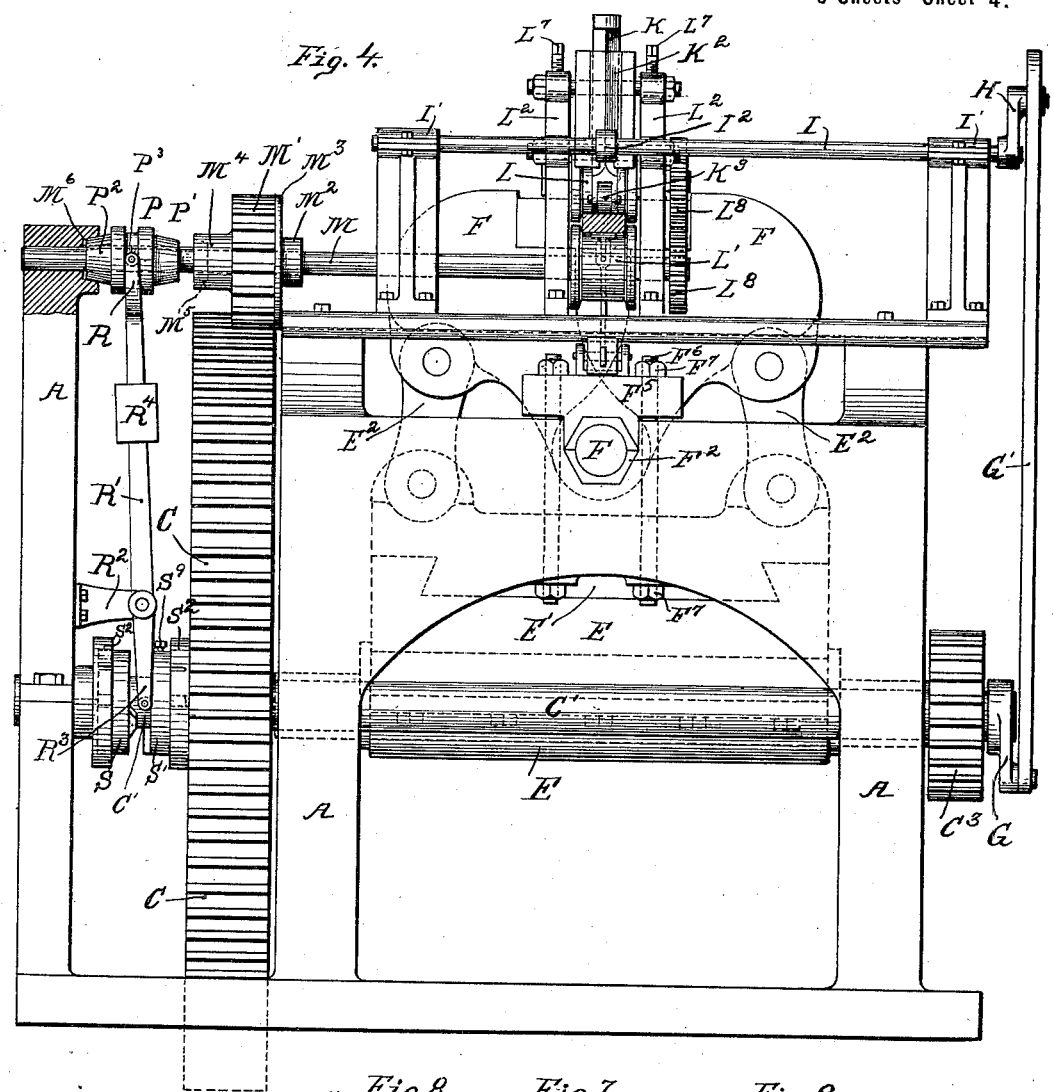

No. 655,718. Patented Aug. 14, 1900.
J. LANZ.
APPARATUS FOR SWAGING AXLES.
(Application filed Apr. 24, 1897. Renewed July 9, 1900.)
(No Model.) 6 Sheets—Sheet 5.
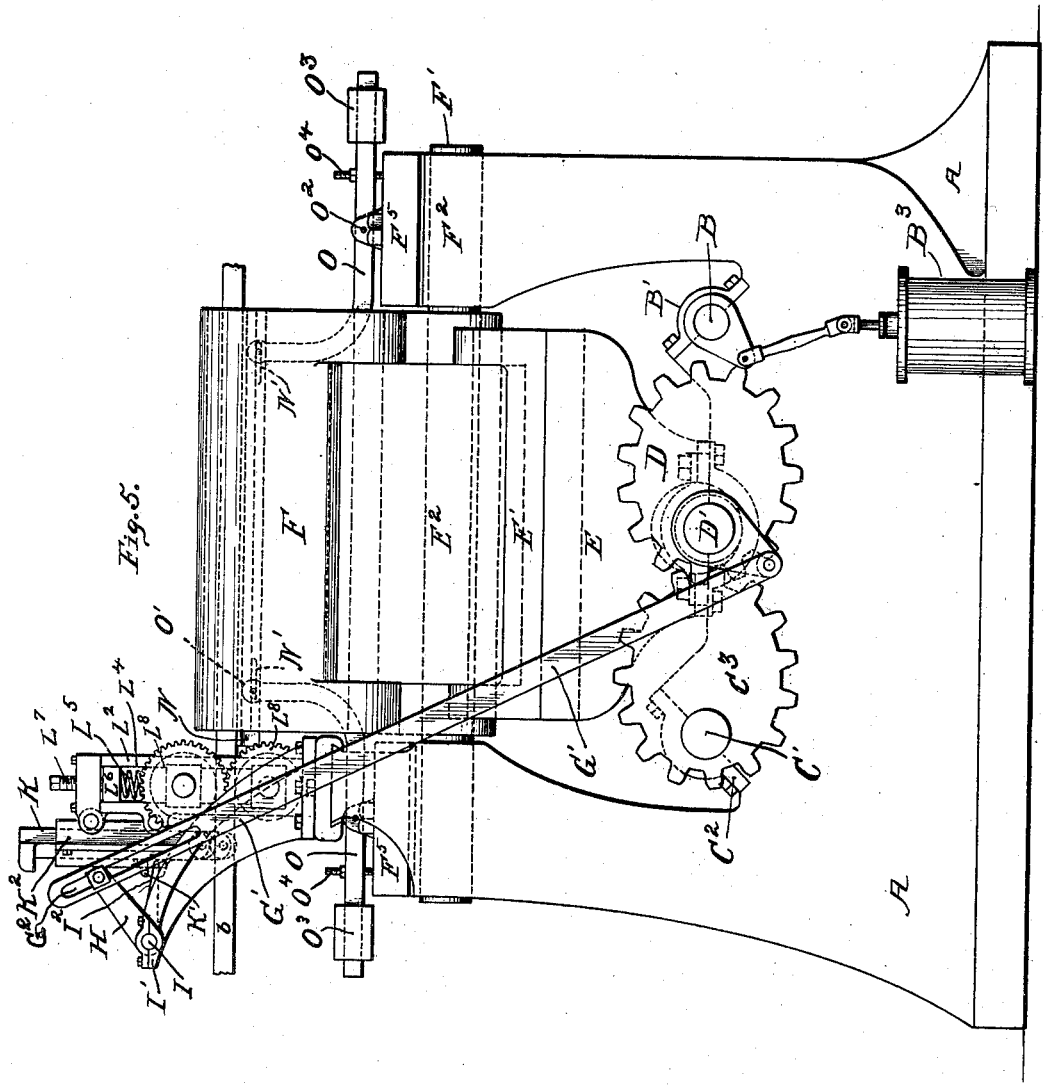

No. 655,718. Patented Aug. 14, 1900.
J. LANZ.
APPARATUS FOR SWAGING AXLES.
(Application filed Apr. 24, 1897. Renewed July 9, 1900.)
(No Model.) 6 Sheets—Sheet 6.
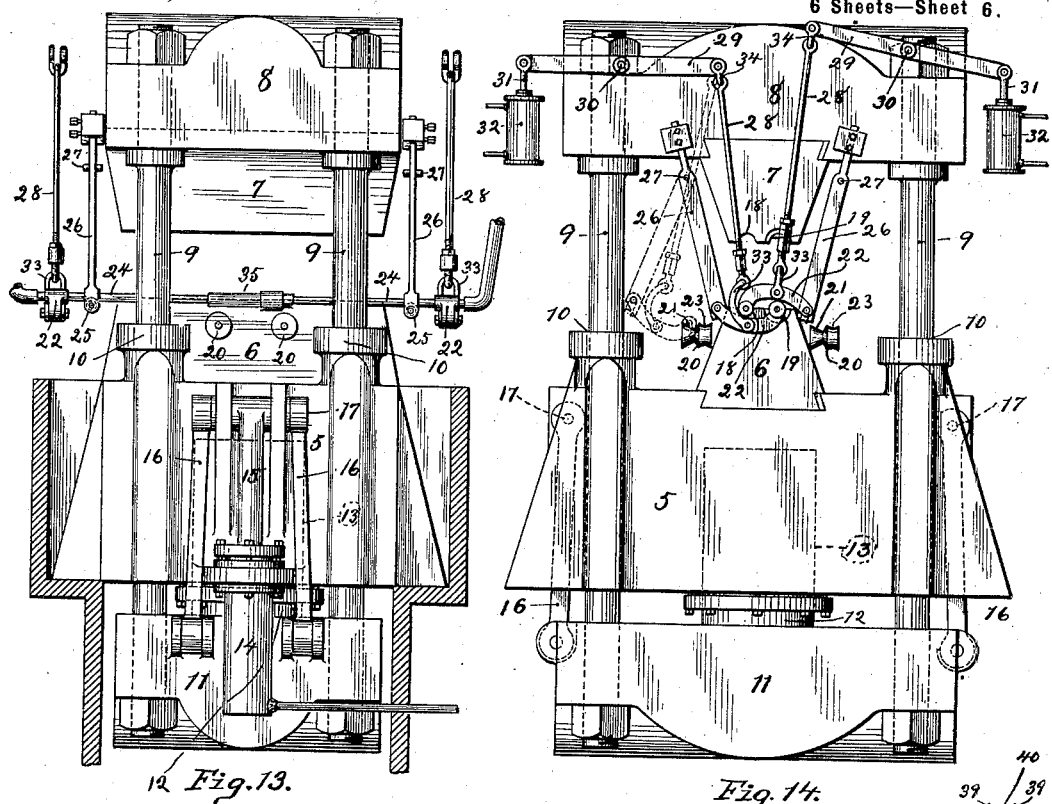
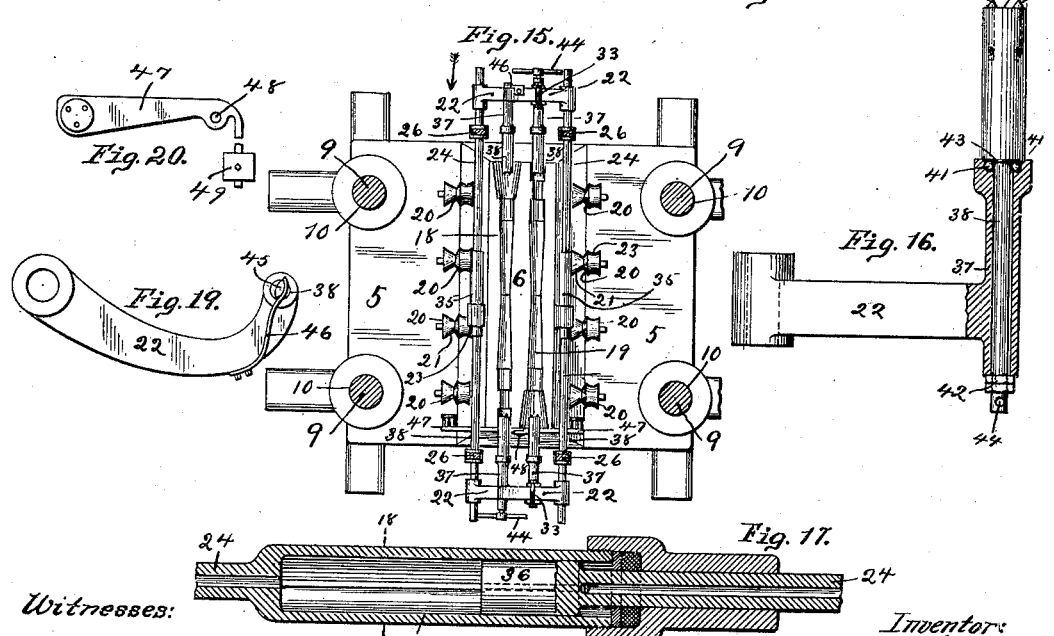
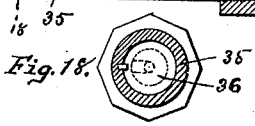
THE NORRIS PETERS CO., PHOTO-LITHO., WASHINGTON, D. C.

UNITED STATES PATENT OFFICE.

JOHN LANZ, OF PITTSBURG, PENNSYLVANIA.

APPARATUS FOR SWAGING AXLES.

SPECIFICATION forming part of Letters Patent No. 655,718, dated August 14, 1900.

Application filed April 24, 1897. Renewed July 9, 1900. Serial No. 23,041. (No model.)

*To all whom it may concern:*

Be it known that I, JOHN LANZ, a resident of Pittsburg, in the county of Allegheny and State of Pennsylvania, have invented a new and useful Improvement in Apparatus for Swaging; and I do hereby declare the following to be a full, clear, and exact description thereof.

My invention relates to apparatus for forming car-axles and other articles.

Figure 1:
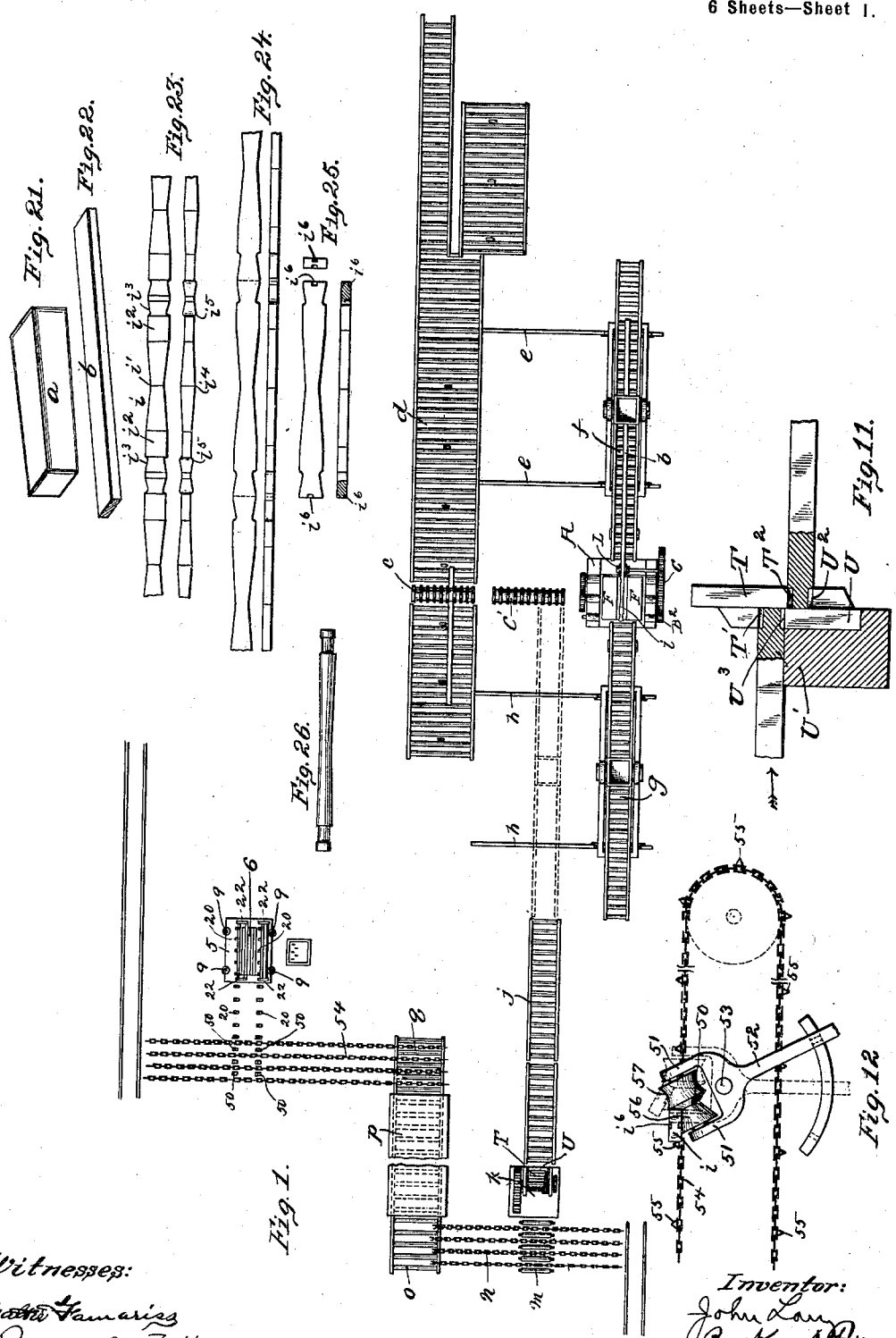
Figure 2:
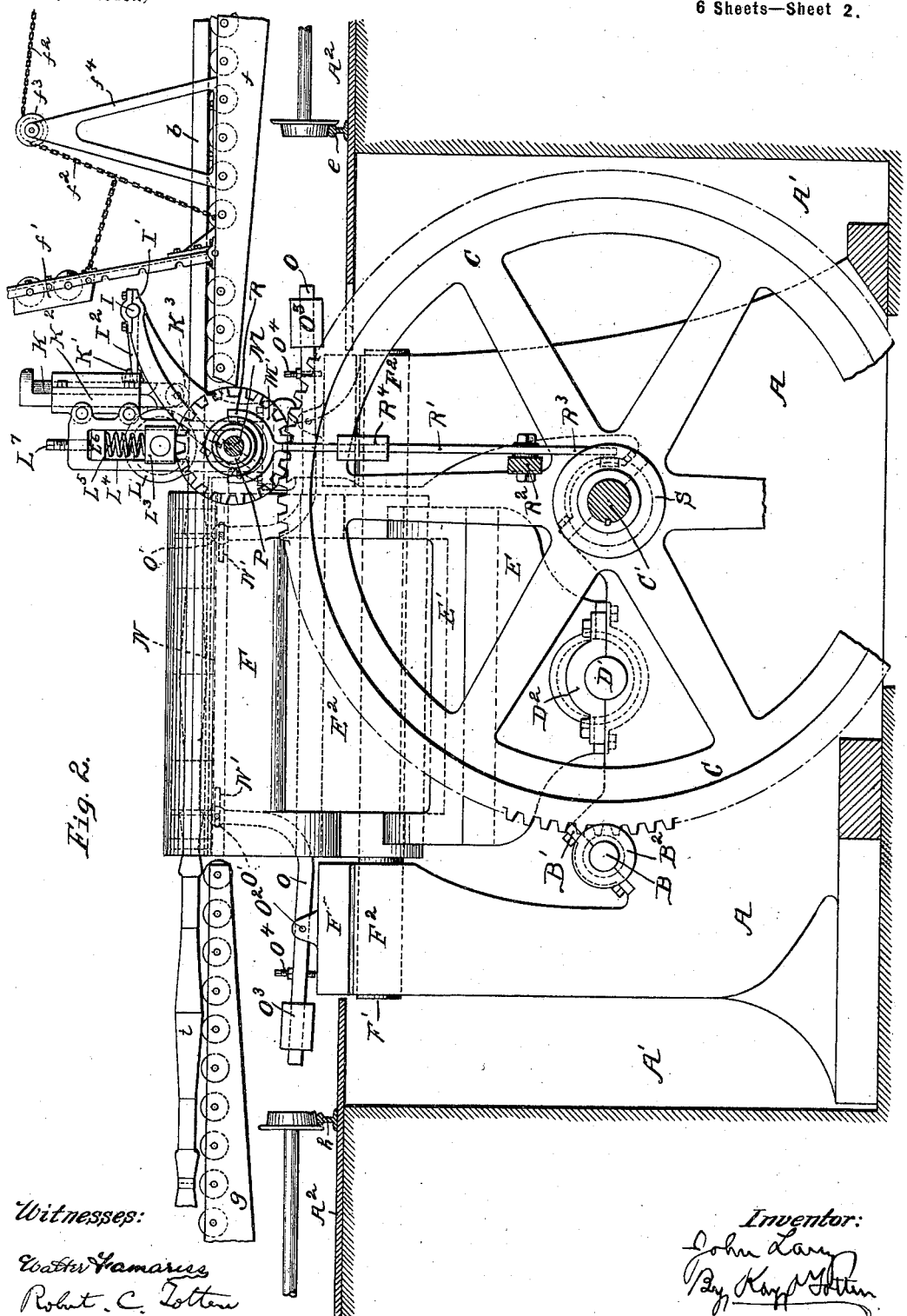

In the accompanying drawings, Figure 1 is a diagrammatic view of the plant embracing my invention. Fig. 2 is a side view of the squeezer or compressing apparatus. Fig. 3 is a top view thereof. Fig. 4 is an end view. Fig. 5 is an opposite side view from that shown in Fig. 2. Fig. 6 is a cross-section on the line 6 6, Fig. 3. Figs. 7, 8, 9, and 10 are detail views of cam mechanism for operating the clutch device of said squeezer. Fig. 11 is a view of the shearing apparatus. Fig. 12 is a detail view of the mechanism for feeding the blanks to the forming or shaping press. Fig. 13 is a side view of the forming or shaping press. Fig. 14 is an end view thereof. Fig. 15 is a plan view, partly in section. Fig. 16 is a detail view of one of the clamping-arms. Fig. 17 is a longitudinal section of the device for throwing the clamping-arms into engagement with the blank in the forming or shaping press. Fig. 18 is a cross-section on line 18 18, Fig. 17. Fig. 19 is a detail view of the means for bringing the clamping device into the proper position for grasping the blanks. Fig. 20 is a detail view of the gage or stop regulating the distance to which the blank may be moved in feeding it to the press. Fig. 21 is a view of an ingot. Fig. 22 is a view of the ingot rolled down to a bar of proper size. Fig. 23 shows a plan and side view of the bar shown in Fig. 22 after it has been subjected to the squeezing action. Fig. 24 is a like view of a portion of the bar after it has passed through the rolls. Fig. 25 is a like view of the bar after it has been cut by the shears, and Fig. 26 is a view of the finished axle.

While I have illustrated and described my invention as applied to the manufacture of car-axles, yet I do not wish to limit myself in any manner to that particular application of my invention.

The rolls by means of which the ingot $a$ is reduced to the bar $b$ of proper width and thickness may be of any well-known form, and as they form no part of my invention I have only illustrated them in a general way in Fig. 1, which is a diagrammatic view of the entire plant for carrying out my invention.

The squeezer consists of the frame A, which is preferably located in a pit A' below the level of the working-floor $A^2$. Mounted in suitable bearings B' of the frame A is a shaft B, which is driven by a suitable engine $B^3$. A spur-wheel $B^2$ on the shaft B meshes with the gear-wheel C on the shaft C', mounted in suitable bearings $C^2$. The opposite end of the shaft C' has the elliptic gear-wheel $C^3$, meshing with the like elliptic gear-wheel D on the shaft D', mounted in suitable bearings $D^2$ in the frame. By the employment of the elliptic gears a variable speed is imparted to the shaft D' for the reason more fully hereinafter set forth. The shaft D' is an eccentric-shaft and passes through the yoke E, which has a sliding dovetailed connection with the slide-block E', as shown in Fig. 6. Links or toggles $E^2$ connect the slide E' with the die-boxes F. These die-boxes are hinged together by means of the horizontal shaft F', which is supported in bearings $F^2$ in the frame. A cap $F^5$ rests upon the bearings $F^2$, said cap being held in place by the cap-bolts $F^6$, which pass up through the frame and have the nuts $F^7$ screwed thereon. This holds the shaft F' down and prevents its rising when the eccentric-shaft closes the dies. If, however, undue strain is brought to bear on said shaft, the cap-bolts $F^6$ will break or give first and relieve the strain on said shaft. The dies $F^3$ are secured within seats $F^4$ in the die-boxes in any suitable manner, said dies having their squeezing-faces of such configuration as to give the desired swells or protuberances to the rolled bar, as will more fully hereinafter appear. This manner of connecting the eccentric-shaft D' to the die-boxes F imparts motion to both of said die-boxes, while the yoke E is permitted to move in a horizontal and vertical plane simultaneously. This double movement is due to the sliding connection with the slide E'.

On one end of the eccentric-shaft D' is mounted the crank G, which has the pitman G' connected thereto. This pitman is connected at its upper end to the crank-arm H, a slot $G^2$ in said pitman allowing for the movement of said pitman for a certain distance without engaging the arm H. The crank-arm H is connected to the rock-shaft I, mounted in bearings I'. Secured to the rock-shaft I is the inwardly-projecting arm $I^2$, which is adapted to engage a lug K' on a vertically-sliding gate K, working in suitable guides $K^2$. At the lower end of the gate K is journaled a roller $K^3$. This gate K acts to close the pass between the feed-rolls L L' until said rolls have revolved to a certain point, when said gate rises. The upper roll L is mounted in the housings $L^2$. The feed-roll L is journaled in suitable brasses $L^3$, adapted to move in guides $L^4$. A spring $L^5$ is interposed between the brasses $L^3$ and a block $L^6$. Set-screws $L^7$ pass down through the top of housings and regulate the pressure on the springs $L^5$. In this manner the upper feed-roll L is permitted to yield in case too great a strain is brought upon it. The lower feed-roll L' is mounted on the shaft M, journaled in said housings $L^2$ and in the frame A. Gear-wheels $L^8$ connect the rolls L L'.

Between the dies $F^3$ is the table or platform N, which supports the heated bar while it is being fed to said dies and discharged therefrom. This platform or table N may be formed of a T-bar, and it rests within the forked ends O' of the curved arms O, which are pivoted at $O^2$ to the frame. The table N has the slots N' formed therein, with which the pins which connect the arms O to said table engage. This gives said table a certain amount of longitudinal play. The arm O has the adjustable weights $O^3$ on the ends thereof. The threaded bolts $O^4$ act as stops to regulate the height of the forked ends O', and consequently the height of the table N. By screwing down the nuts on said bolts $O^4$ the weights $O^3$ act to elevate the inner curved ends of the arms O. When sufficient downward pressure is brought to bear upon the table N, said table will yield and the inner ends of the arms O will descend, while the weighted ends will rise for the purpose and in the manner more fully hereinafter set forth.

On the shaft M is the pinion M', which meshes with the large gear-wheel C. This pinion M' is loosely mounted on the shaft M and is held from sliding on the shaft M in one direction by the collar $M^2$, secured on said shaft, and in the other direction by the flange $M^3$ on said pinion overlapping the gear-wheel C. The projection $M^4$ on the pinion M' has the tapering seat $M^5$ formed therein. A clutch P is adapted to slide on the shaft M, being splined thereto, said clutch having the conical end P', adapted to enter the tapering seat $M^5$. The other end $P^2$ of the clutch P is also tapering or cone-shaped and is adapted to enter a correspondingly-shaped seat $M^6$ in the frame. The clutch P has the annular groove $P^3$, with which the upper bifurcated end R of the lever R' engages. This lever R' is pivoted to the bracket $R^2$ on the frame. The lower knocker end $R^3$ of the lever R' engages the shaft C'. The lever R' has the weight $R^4$. The cams S S' on the shaft C' alternately engage the lower end of said lever R' at opposite sides thereof, whereby said lever is first moved to one side and then to the other. In this manner the clutch P is also alternately thrown into and out of engagement with clutch-face $M^5$, whereby the intermittent rotary movement is imparted to the shaft M and rolls L L' for the purpose more fully hereinafter set forth. These cams S S' are illustrated in detail in Figs. 7, 8, 9, and 10. The coupling-box $S^2$ is keyed to the shaft C'. This box has the seat $S^3$ with the lug $S^4$ therein formed integral with said box. The adjustable cam $S^5$ has a lug $S^6$ formed thereon, which is adapted to enter the seat $S^3$ and engage the lug $S^4$ in said seat. A cam-face $S^7$ is formed on the adjustable cam $S^5$. Liners $S^8$ may be interposed between the lugs $S^4$ and $S^6$ to adjust the cam according to the intervals of revolution with which the clutch P is to move back and forth and so regulate the feed of the rolls L L'. A set-screw $S^9$ passes through the cam $S^5$ and engages the shaft C', whereby said cam is held from movement on said shaft. The coupling-box $S^2$ may have an opening $S^{10}$ for the insertion of small sheet-iron liners where desired.

I will now describe the shears which may be used in connection with my improved method of forming axles.

The reference-letter T represents the upper shear-knife, which has the die or punch T' for indenting the upper face of the bar during the shearing of an axle length thereform. The lower shear-knife U is stationary and is held within the bed U'. This lower shear-knife U has also an indenting die or punch $U^2$, which is adapted to indent the lower face of the axle length just cut. The knife U has also the die or punch $U^3$, which extends above the bed U' to form an indentation on the lower face of the bar, as will more fully hereinafter appear. The shear-knife T has also a projection $T^2$, which forms a punch.

I will now describe the shaping or forming press by which the blank is brought to finished shape.

5 designates the bed of the hydraulic press, which carries the stationary die or anvil 6, above which is the movable die 7, held by the die-head 8, which is carried by the guides 9, moving in guideways 10 in the bed 5. These guides extend through the bed and are connected to a cross-head 11, which is forced downward by means of the plunger 12, moving in the hydraulic cylinder 13, which is formed in and is a part of the bed 5. The movable die 7 is raised by means of two smaller cylinders, one of which is shown in Fig. 13 and designated by the numeral 14. The piston-rod 15, acting in this cylinder, lifts the cross-head 11 by means of the connecting-links 16, which are connected to the shaft 17 at the end of the piston-rod 15. The dies 6 and 7 are so arranged that two axles may be operated upon at the same time with one stroke, the die-seat 18 acting upon one end and a portion of the length of the axle, while the die-seat 19 acts upon the opposite end to complete the axle, said axle having been transferred to seat 19 in the manner hereinafter set forth. The blank from which the axle is formed is run in upon the rollers 20, traveling in the direction of the arrow, into the angular grooves 21 and is taken therefrom by means of the swinging arms 22, which will be more fully hereinafter described, and placed in the dies to be swaged or shaped. Two axle-blanks are picked up at one time, each from opposite sides of the machine, by means of these arms 22 and are placed in the dies for the operation of swaging. The operation of swaging then proceeds, the blank being turned partially during each stroke of the press until the blank is properly shaped, when the die 7 is then raised and the arms 22 carry the partially-forged axles across from one die-seat to the other, where the swaging operation proceeds, finishing the other end of the axle and completing its formation. The finished axles are then carried, by means of said arms 22, to the grooves 23 of the rollers 20, which have been reversed, whereby the finished axles are carried off onto suitable conveying apparatus and other blanks are fed into the rollers and the operation is repeated.

I will now describe the arms 22 and the manner in which they are operated.

The arms 22 are rigidly connected to the hollow shaft 24, which shaft is supported on rollers 25, which have their bearings in the hangers 26, said hangers being rigidly connected to the frame of the machine. As there are two sets of arms 22 acting at the same time upon two different axles, I will describe one of them, as each set is alike and is operated in the same manner. This hanger is pivotally connected in any suitable manner at 27. The arms 22 are also supported at about their centers by the hanger 28, which is secured to the end of the lever 29. This lever 29 is fulcrumed at 30, the opposite end of this lever being connected to the piston-rod 31 of the steam or hydraulic cylinders 32. The hanger 28 is intermediately connected to the arm 22 by means of the clevis 33, and it is also connected to the lever 29 by means of a clevis 34. These are for the purpose of giving it universal movement. The hollow shaft 24 before spoken of, to which the arms 22 are attached, is in two parts. One of these parts is enlarged near the center of the machine to form the hydraulic cylinder 35, the other part forming a piston-head 36, which is splined and operates within said cylinder 35. The outer ends of these hollow shafts 24 are connected by suitable hose or other flexible connections to a valve (not shown) through which the fluid is admitted to operate said cylinder 35. At the outer end of the arms 22 is the bearing 37, in which is seated the shaft 38, the outer end of the said shaft having on its face the removable lugs 39, which are designed to enter the depressions formed in the end of the axle-blank, as will more fully hereinafter appear.

When it is desired to lift the blank from the rollers 20 to place it in the dies, the arms 22 are swung backward by the operator, so that the lugs 39 come into alinement with the indentations in the ends of said axle-blanks, and the arms are then drawn together by means of the hydraulic pressure in the cylinder 35, so that the lugs 39 enter said depressions in the ends of the axle-blanks, and the faces 40 of the shaft 38 grip the blank firmly between them. The cylinder 32 is then operated to lift the hanger 28 through the lever 29, and the axle-blank is thus lifted above the plane of the anvil 6 and is then swung in over one of the die-seats by hand or any suitable power, and pressure is then released in cylinder 32, and the blank is allowed to drop into the die-seat. As before described, a blank is placed in the other die-seat from the rolls on the opposite side of the anvil.

In the operation of forging the axle it is necessary, as before stated, to turn the blank after each stroke or succession of strokes, and to accomplish this the shaft 38 is mounted in its bearing 37 by means of the antifriction rollers or balls 41. The shaft 38 is enlarged at its outer end, forming a shoulder 43. This shoulder acts as a cone, which bears against the balls 41 and is held in place by means of the jam-nuts 42. The handle-bar 44 has a square eye in the center thereof, adapted to engage with the square end of this shaft and is grasped by the operator when he desires to turn the blank. As there are two of these arms used in picking up the axle-blank and as it requires but one operator for each blank, it is necessary to have the lugs 39 at the opposite end of the machine from the operator come into proper alinement with the indentations on the axle-blank automatically. To accomplish this, the outer end of the shaft 38 has a flattened lug 45, against which a spring 46 operates, so that this shaft will be automatically turned into proper position for clutching another blank whenever it is free to move—that is, immediately the completed axle has been dropped.

When the axle-blank is run in upon the rollers 20, it is necessary to provide a stop to keep it from going too far. To provide for this, a weighted arm 47 is pivoted to the anvil 6 at 48. This arm is forced down out of the way by contacting with the outer end of the shaft 38 when it comes into position to drop the finished axle. When a new blank has been received by the carrier device and has been lifted to the dies, this arm is raised into proper position by means of the weight 49, so that a blank coming in upon the rollers 20 will not go beyond the proper position. In line with the rollers 20 are the tilting rollers 50, one of which is represented in Fig. 12. These rollers 50 are journaled in the forked ends 51 of the forks 52, which are adapted to swing on the shaft 53. The tilting rollers 50 are arranged in such relation to the endless carrier 54 as to receive therefrom the axle-blanks conveyed by said carrier. This carrier 54 has the lugs 55 at intervals thereon, which engage with the axle-blanks and carry said blanks and deliver them onto the rollers 50. In order to receive the axle-blanks from the carrier 54, the forks are moved to the positions shown in Fig. 12, whereupon the axle-blank is deposited within the angular grooves 56 in said rollers, which are in line with angular grooves 21 of the rollers 20. The finished axles as they are carried off in the grooves 23 of the rollers 20 pass into the curved grooves 57 of the rollers 50, whereupon said rollers are tilted into the opposite position from that shown in Fig. 12, and the forged axles are deposited on the carrier 54 to be conveyed to the finishing department.

The operation of the mechanism is as follows: A suitable ingot $a$, such as illustrated in Fig. 21, having been properly heated is passed back and forth through the rolls $c$ while supported on the feeding-table $d$. The ingot is passed from one side of the rolls to the other through suitable passes until it has been rolled out to the full extent in said rolls. The bar when thus rolled is transferred onto the apron $f$, parallel with the apron $d$. The apron $f$ travels on the rails $e$, and said apron is brought into position to continue the rolling of the bar through several passes of the rolls $c'$ until a bar $b$ has been rolled from the ingot $a$ of suitable width and thickness. The apron $g$, traveling on the tracks $h$, acts in conjunction with the apron $f$ during this rolling through the rolls $c'$. The apron $f$ has the hinged section $f'$, which is shown elevated in Fig. 2. It is drawn up by means of the chain $f^2$, working over pulleys $f^3$ on standard $f^4$. This hinged section when drawn up reduces the length of the apron, so that the same apron may be used for the rolls $c'$, as well as the squeezer. The bar $b$ when properly reduced is transferred to the apron $f$. It will then be fed forward by said apron until its front end comes against the roller $K^3$ of the gate K. The squeezer having been put into operation and the parts having been set at proper positions with reference to each other to provide for the squeezing of the bar at proper intervals, the pitman $G'$ will raise the crank-arm H, so as to move the rock-shaft I. This movement of the rock-shaft I will raise the arm $I^2$, and consequently the gate K. Upon the withdrawal of the gate K the bar $b$ will be fed in by the rolls L L' onto the table N between the squeezing-dies $F^3$. The bar $b$ is carried in between the dies $F^3$ by the rolls L L', the roller $K^3$ rolling on said bar far enough to make a short "crop end" and give a starting-point on the bar for the next revolution of the squeezer. When the bar $b$ has been fed into the dies the proper distance, the feed-rollers L L' are stopped. This stoppage of the feed-rollers L L' is caused by the cam S' moving around in such position as to throw the lever R' into such position as to bring the conical end $P^2$ into engagement with the seat $M^6$ in the frame and withdraw the conical end P' from the seat $M^5$ in the pinion M'. The friction of the conical end $P^2$ in the seat $M^6$ of the rigid frame will tend to stop the rotation of the rolls and the momentum of the bar, and the pinion M' being loosely mounted on the shaft M no further rotary movement is imparted to said shaft M, and the bar $b$ comes to a standstill. Immediately the feed-rolls are stopped the eccentric-shaft D' will have come into such position as to advance the die-boxes F toward each other, as represented in Fig. 6. This movement of the eccentric-shaft D' is caused by the elliptic gear-wheels $C^3$ D, mounted on the shafts C' and D', respectively. The connection of the eccentric-shaft to the die-boxes in this manner gives motion to both die-boxes and the yoke moves horizontally and vertically simultaneously, the said contramovement being compensated for by the slides. The elliptical gear-wheels give the eccentric-shaft the variable speed upon each revolution, which is essential to give more time to feed the bar to the dies and less time of contact of the dies on the bar, thus reducing the loss of heat in the bar. The bar $b$ therefore having been fed to the dies $F^3$ and said dies having been advanced toward each other in the manner described portions of the section of the bar comprised within the length of the dies are subjected to the squeezing action of the same. The dies $F^3$ in the making of an axle are given a configuration such as will give the form to the bar represented in Fig. 23. The bar $b$ is squeezed edgewise and conforms to the configuration of said dies, whereby said bar is changed to irregular rectangular form, but not materially changed as regards its area in cross-section. The section $i$, squeezed by the dies, will in plan view be contracted at its central portion, as at $i'$, and will gradually increase in thickness to the extent represented at $i^2$, while beyond $i^2$ will be the inwardly-tapering ends $i^3$. A side view of said blank is represented in the same Fig. 23, showing that by the compressing of the central portion $i'$ edgewise a corresponding swell $i^4$ has been given to the upper and lower faces of the blank and by the formation of the inwardly-tapering end $i^3$ a swell or protuberance $i^5$ has been formed on said faces of the blank. As the squeezing operation takes place it is apparent that the swells formed on the upper and lower faces of the blank resting upon the platform N will cause said platform to yield, for which provision was made in the manner hereinbefore set forth. When the dies $F^3$ have squeezed the bar and have formed the section thereon represented by the letter $i$, Fig. 23, the eccentric-shaft D' will revolve further and withdraw the die-boxes F, releasing the dies $F^3$ from contact with the blank. At the same time when the die-boxes F have withdrawn enough for clearance of projections of the dies the cam S will have come around in such position as to throw the lever R' over to bring the conical face P' into the seat $M^5$ in the gear-wheel M'. This will cause a further rotation of the feed-rolls L L', whereupon the bar $b$ will be fed by the feed-rolls into position upon the platform N, so that when the eccentric-shaft D' comes around another blank-section $i$ will be squeezed in the manner hereinbefore set forth, the feed-rolls L L' having been stopped as before. In this manner the bar $b$ is squeezed into a multiple of blank-sections suitable for forming axles. After the bar has been passed through the squeezers it will rest upon the apron $g$. It is then transferred by the apron $g$ over the tracks $h$ into line with the end passes of the rolls $c'$. The apron $f$ is also transferred by the tracks $e$ to the rolls $c'$, and the bar $b$ having been squeezed in the manner described is passed through the rolls several times until the swells or protuberances $i^4$ $i^5$ are reduced and the bar further elongated, so that it is brought to the forms represented in Fig. 24, in which the first form is a plan view and the second a side view, showing that the swells or protuberances have been reduced and elongated, leaving the bar with flat and even upper and lower faces. The blank-sections in cross-section will have such areas as will correspond substantially to the areas in cross-section of the finished axle taken at the same points. In this manner the metal is properly distributed for the shaping process. The bar having been rolled out with flat and even upper and lower faces, as in Fig. 24, it is carried onto the feed-table $j$ in position to be fed to the shears $k$. As Fig. 11 illustrates these shears in detail, I will describe the operation of shearing with reference to that figure. The bar traveling in the direction of the arrow is carried under the upper shear-knife, resting upon the lower bed U'. The crop-end formed in the squeezers is first sheared from the bar, and when this crop end is sheared off the upper knife T in shearing this crop end descends far enough to force the die or punch T' into the upper face of the end of the bar, while the punch $U^3$ on the lower knife is forced into the lower face of the bar to form an indentation therein. This is caused by the force of the descent of the upper die with the bar resting upon the punch $U^3$. In this manner in cutting off the crop end indentations $i^6$, such as are represented in Fig. 25, are formed at the end of said bar upon its upper and lower faces. The crop end having been sheared off and the indentations formed as described, the bar is then fed into the shears the length of the blank-section, whereupon said upper knife T again descends and in its descent the blank sheared off is forced by said upper knife T down onto the punch $U^2$. The pressure of the upper knife forces the punch $U^2$ into the axle-blank to form an indentation on its lower face, while the projection $T^2$ of the knife T forms an indentation on the upper face. In this manner the axle-blank is provided at each end with the indentations $i^6$. In cutting off this blank from the bar like indentations are formed in the manner hereinbefore described on the end of the bar which is to form the next axle-blank. As the axle-blanks are cut from the bar they drop onto the rollers $m$. The carrier $n$, similar to the carrier represented in Fig. 12 and having lugs thereon, carries the axle-blank over to the feeding-rollers $o$ at the mouth of the continuous furnace $p$. The axle-blank is fed into the furnace $p$, and its heat is retained or properly raised, when it is carried by the rollers in said furnace out onto the rollers $q$. While the furnace may contain a number of axle-blanks, only two are carried therefrom at one time to be transferred to the hydraulic press. The carrier 54 takes the axle-blanks from the rollers $q$ and carries them into the angular grooves 56 of the rollers 50, as represented in Fig. 12. The forks carrying the rollers 50 are swung into such position that the axle-blank will enter the grooves 56 of the rollers 50, and as there are two sets of these rollers 50, as represented in the diagrammatic view, Fig. 1, the first set will have to be tilted out of the way to allow the axle-blank to pass over it to the second set. When one of the axle-blanks has passed over the first set of rollers 50 and has been deposited in the angular groove of the second set, the other axle coming along on the carrier 54 is received by the first set of rollers 50. The forks of the rollers are then brought to a vertical position, whereupon the axle-blanks will be in line with the angular grooves 21 of the rollers 20, resting in the angular grooves 21 of the same. The axle-blanks are carried on said rollers until their forward ends strike the stops 47. The swinging arms 22 are then swung back in position to bring the shafts 38 in alinement with the axle-blanks, so that the lugs 39 on the ends of said shafts can enter the indentations $i^6$, formed in the ends of the axle-blanks. The lowering of the arms 22 to effect this result will force the stops 47 out of the way in order to permit the lugs 39 on the ends of the shafts 38 adjacent thereto to engage with the indentations on the inner ends of said blanks. This movement of the arms is effected by suitable levers which operate the pistons in the cylinders 32. The lugs 39 on the shafts 38 having been brought into coincidence with the indentations of the axle-blanks, the front and rear shafts 38 of the arms 22 are then moved toward each other, so as to bring the lugs 39 into engagement with said indentations.

This is accomplished by admitting water or steam to the cylinder 35, whereupon the hollow shaft 24 recedes within said cylinder 35 far enough to force the lugs 39 into the indentations in the ends of the axle-blank and hold the same securely therein. The axle-blanks having been grasped in this manner by the arms 22, said arms are then swung over in such position as to lower the axle-blanks into the die-seats 18 and 19, said blanks being placed in said grooves edgewise. The movable die 7 is then lowered and the greater part of the axle-blank in the die-seat 18 is acted on so as to shape said part of the axle-blank so acted on by the dies to finished shape, while the die-seat 19 acts upon the greater part of the other axle-blank in the same manner. While the axle-blanks are in the dies, said blanks are turned by means of the handle-bar 44, which has its eye engaging the end of the shaft 38. By turning this handle-bar the axle is turned into different positions in order to be properly shaped. Accordingly I have two axle-blanks shaped for the greater part of their length to the desired shape of the finished axle; but it is necessary now to give the entire axle the finished shape, which is done in the following manner: After the axle-blanks have been shaped for the greater part of their length the blank in the die-seat 18 is transferred to the die-seat 19 and the axle-blank in the die-seat 19 to the die-seat 18. This is accomplished by swinging the arms 22 into such positions as to effect this result, whereupon the forging operation is again repeated until the ends of the axle-blanks not finished by the first forging operation are brought to the finished shape. The axle will then be in the form shown in Fig. 26. The finished axles are lifted from the die-seats while still held by the arms 22 and are transferred to the grooves 23 of the rollers 20. When deposited on said rollers, the piston 36 in the cylinder 35 is operated to release the shaft 38 of the arms 22 from engagement with the finished axles. Power is applied to drive the rollers 20 in the proper direction, when the axles resting thereon will be carried into the grooves 57 of the rollers 50. By tilting said rollers 50 in the manner hereinbefore set forth the finished axles are dumped onto the carrier 54 and transferred thereby to a point where they may be loaded on cars for transportation.

My invention may be applied to the manufacture of rods, levers, crowbars, mandrels, &c.

What I claim as my invention, and desire to secure by Letters Patent, is—

1. In swaging apparatus, the combination with a suitable frame, of an eccentric-shaft, a yoke mounted on said shaft, a sliding block engaging said yoke, oppositely-arranged die-boxes, and connections between said sliding block and said die-boxes, substantially as set forth.

2. In swaging apparatus, the combination with a suitable frame, of an eccentric-shaft, a yoke mounted on said shaft, a sliding block engaging said yoke, a shaft at right angles to said eccentric-shaft, die-boxes mounted on the former, and links connecting said die-boxes to said sliding block, substantially as set forth.

3. In swaging apparatus, the combination with a suitable frame, of an eccentric-shaft, a yoke mounted on said shaft, a sliding block engaging said yoke, a shaft at right angles to said eccentric-shaft, die-boxes mounted on the former, links connecting said die-boxes to said sliding block, and a cap over the end of said shaft carrying the die-boxes, and bolts passing through said cap and said frame, substantially as set forth.

4. In swaging apparatus, the combination with a suitable frame, of an eccentric-shaft, a yoke mounted on said shaft, oppositely-arranged die-boxes, connections between said yoke and said die-boxes, an elliptic gear-wheel on said eccentric-shaft, a shaft parallel to said eccentric-shaft, and an elliptic gear-wheel on said shaft meshing with the elliptic gear-wheel on said eccentric-shaft, substantially as set forth.

5. In swaging apparatus, the combination with a suitable frame, of oppositely-arranged die-boxes, mechanism for operating same, and a yielding table located between said die-boxes, substantially as set forth.

6. In swaging apparatus, the combination with a suitable frame, of oppositely-arranged die-boxes, mechanism for operating same, a table located between said die-boxes, and rocking arms connected to said table, substantially as set forth.

7. In swaging apparatus, the combination with a suitable frame, of oppositely-arranged die-boxes, mechanism for operating same, a table between said die-boxes, said table having slots therein, and rocking arms engaging said slots, substantially as set forth.

8. In swaging apparatus, the combination with a suitable frame, of oppositely-arranged die-boxes, mechanism for operating same, a table between said die-boxes, said table having slots therein, rocking arms engaging said slots, and weights at the outer ends of said arms, substantially as set forth.

9. In swaging apparatus, the combination with a suitable frame, of oppositely-arranged die-boxes, mechanism for operating same, a table between said die-boxes, said table having slots therein, rocking arms pivoted to said frame, said arms engaging said slots, weights on the outer ends of said arms, and a stop on said arms, substantially as set forth.

10. In swaging apparatus, the combination with a suitable frame, of oppositely-arranged die-boxes, mechanism for operating same, a table between said die-boxes, feed-rolls and mechanism for arresting the momentum of the bar fed thereto and for imparting an intermittent rotary movement to said roll, substantially as set forth.

11. In swaging apparatus, the combination with a suitable frame, of oppositely-arranged die-boxes, mechanism for operating same, a table between said die-boxes, feed-rolls, mechanism for imparting an intermittent rotary movement to said rolls, a gate for said rolls, and mechanism for raising and lowering said gate, substantially as set forth.

12. In swaging apparatus, the combination with a suitable frame, of oppositely-arranged die-boxes, mechanism for operating same, a table between said die-boxes, feed-rolls, mechanism for imparting an intermittent rotary movement to said rolls, a gate for said rolls, a roller on said gate, and mechanism for raising and lowering said gate, substantially as set forth.

13. In swaging apparatus, the combination with a suitable frame, of oppositely-arranged die-boxes, mechanism for operating same, a table between said die-boxes, feed-rolls, mechanism for imparting an intermittent rotary movement to said rolls, a vertically-movable gate for said rolls, a rock-shaft, a projection on said rock-shaft adapted to engage said gate, and mechanism for rocking said rock-shaft, substantially as set forth.

14. In swaging apparatus, the combination with a suitable frame, of oppositely-arranged die-boxes, mechanism for operating same, a table between said die-boxes, feed-rolls, mechanism for imparting an intermittent rotary movement to said rolls, a rock-shaft, a projection on said rock-shaft adapted to engage said gate, a pitman connecting said rock-shaft with a crank-shaft, substantially as set forth.

15. In swaging apparatus, the combination with a suitable frame, of oppositely-arranged die-boxes, mechanism for operating same, feed-rolls, a shaft for driving said rolls, a loose pinion on said shaft, a driven gear-wheel engaging said pinion, a sliding clutch on said shaft, a lever engaging said clutch, and cam mechanism engaging said lever for throwing said clutch into and out of engagement with said pinion, substantially as set forth.

16. In swaging apparatus, the combination with a suitable frame, of oppositely-arranged die-boxes, mechanism for operating same, feed-rolls, a shaft for driving said rolls, a loose pinion on said shaft, said pinion having a clutch-face, a driven gear-wheel engaging said pinion, a sliding clutch on said shaft, a clutch-face formed in said frame, a lever engaging said clutch, and mechanism for throwing said clutch into engagement with said clutch-faces alternately, substantially as set forth.

17. In clutch-operating mechanism, the combination with a sliding clutch, an operating-lever, a coupling-box mounted on a power-driven shaft, said coupling-box having a lug therein, a cam in said box having a lug engaging with said lug in said coupling-box, and means for securing said cam therein, said cam being adapted to engage said lever, substantially as set forth.

18. In clutch-operating mechanism, the combination with a sliding clutch, an operating-lever, a coupling-box mounted on a power-driven shaft, said coupling-box having a lug therein, a cam in said box having a lug engaging with said lug in said coupling-box, a liner inserted between said lugs, and means for securing said cam within said coupling-box, said cam being adapted to engage said lever, substantially as set forth.

19. In swaging apparatus, the combination with a suitable frame, of dies and mechanism for operating same, a table between said dies, feed-rolls arranged in suitable housings, vertically-movable journal-boxes within which the upper feed-roll is mounted, and a spring interposed between said boxes and a suitable abutment, substantially as set forth.

20. In swaging apparatus, the combination with a suitable frame, of dies and mechanism for operating same, a table between said dies, feed-rolls arranged in suitable housings, vertically-movable journal-boxes within which the upper feed-roll is mounted, a spring interposed between said boxes and a movable block, and a set-screw in said housings adapted to engage said block, substantially as set forth.

In testimony whereof I, the said JOHN LANZ, have hereunto set my hand.

JOHN LANZ.

Witnesses:
ROBT. D. TOTTEN,
ROBERT C. TOTTEN.